United States Patent [19]

Mazzei et al.

[11] 4,328,364
[45] May 4, 1982

[54] ASYMMETRIC HYDROGENATION OF PROCHIRAL OLEFINS BY COMPLEXES OF TRANSITION METALS IMMOBILIZED IN CLAY-LIKE MINERALS

[75] Inventors: Marcello Mazzei, Rome; Mario Riocci, Monterotondo; Walter Marconi, San Donato Milanese, all of Italy

[73] Assignee: Snamprogetti, S.p.A., Milan, Italy

[21] Appl. No.: 152,765

[22] Filed: May 23, 1980

Related U.S. Application Data

[63] Continuation of Ser. No. 946,758, Sep. 28, 1978, abandoned.

[51] Int. Cl.$^3$ .................... C07B 1/00; C07C 51/36; C07C 67/303

[52] U.S. Cl. ................... 562/401; 560/142; 562/433; 562/450; 562/567; 562/575; 585/275; 585/277

[58] Field of Search ............ 562/401, 450, 433, 567, 562/575; 260/429 J; 560/142; 564/303; 585/275, 277

[56] References Cited

U.S. PATENT DOCUMENTS 4,119,652 10/1978 Knowles et al. .............. 260/429 R
4,124,533 11/1978 Knowles et al. .............. 562/567

*Primary Examiner*—Natalie Trousof
*Assistant Examiner*—Vera C. Clarke
*Attorney, Agent, or Firm*—Morgan, Finnegan, Pine, Foley & Lee

[57] ABSTRACT

For the asymmetrical hydrogenation of prochiral olefins, a catalyst system is proposed which is a Rhodium cationic complex immobilized on a clay-like mineral such as hectorite, bentonite and haloysite.

8 Claims, No Drawings

ASYMMETRIC HYDROGENATION OF PROCHIRAL OLEFINS BY COMPLEXES OF TRANSITION METALS IMMOBILIZED IN CLAY-LIKE MINERALS

This is a rule 60 continuation application of Ser. No. 946,758 filed on Sept. 28, 1978, now abandoned.

This invention relates to a method for the hydrogenation of prochiral olefins with induction of asymmetry by the agency of complexes of transition metals immobilized in clay-like minerals.

More exactly, the present invention relates to methods for the asymmetrical hydrogenation of prochiral olefins by cationic complexes of rhodium with amine derivatives of phosphorus which have been immobilized on silicates, more particularly of the kind of the smectites and serpentine kaolin.

The scrutiny of the technical literature of these last years shows a considerable interest in the use of the asymmetric catalytic systems for the preparation of optically active compounds by reactions of hydrogenation, hydrosilylation and hydroformylation.

In reactions of hydrogenation of alpha-acylamidoacrylic acids, for example, catalyzed by chiral complexes of rhodium o-anisylcyclohexylmethylphosphine, optical yields are reported as high as 95%–96% which are virtually near those experienced in enzymic processes.

However, the use of homogeneous catalysts involves a great number of problems, including the difficulty of separating the reaction product and the recovery of the catalyst; this becomes especially cumbersome when traces of the catalyst are retained in the reaction product. To overcome these difficulties, the homogeneous catalysts have been insolubilized by covalent bonds with substrates which are predominantly of an organic nature.

The polymers which are most frequently used are polystyrene which has been cross-linked with divinylbenzene and functionalized with phosphine bonds to which transition metal are co-ordinated. Also copolymers of the same functionalized polystyrene are used.

We are proposing, that which is the subject matter of the present invention, to use clay-like minerals, more particularly of the class of smectites and kaolin, as substrates for homogeneous catalysts of asymmetric hydrogenation reactions.

Smectites are fillosilicates the structural unit of which is composed by a tetrahedral layer, an octahedral layer and another tetrahedral layer with a layer charge of 0.25–0.60 per formula unit due to isomorphic substitutions which are distributed in the tetrahedral and the octahedral layers: such a charge is balanced by easily exchangeable interlayer cations. The exchange capacity is comparatively high and varies from 80 and 150 milliequivalents per 100 grams.

In addition, particularly interesting are a few minerals of the clay type in the group of serpentine kaolin such as halloysite which is the most hydrous variety and has an exchange capacity of about 40 milliequivalents per 100 grams.

The catalysts the subject of the present invention are obtained by simple exchange reaction between the cationic complex of the transition metal and the clay-like materials.

Such catalytic systems have the considerable advantage of the simplicity of preparation and cheapness, especially when compared with the conventional heterogeneization systems which employ modified organic polymeric matrices.

The cationic complex which is catalytically active in the asymmetric hydrogenation reaction can be selected among these having the formula $PR_x^1$ $(NR^2R^3)_{3-x}$, wherein $R^1$ is alkyl, aryl-thio, alkyl-phosphino, aryl-phosphino, amino-phosphino and the like; x varies from 0 to 2; $NR^2R^3$ represents optically active amino groups deriving from the amino compounds as hereinafter described, which constitute a wide category of mono- and poly-dentate ligands, capable of coordinating transition metals, thus forming complexes suitable for the asymmetrical hydrogenation, with high conversion level, of prochiral and racemic olefins, to produce the corresponding saturated compounds with a good optical purity. The preparation of the amino-phosphoorganic compounds is carried out starting from compounds having the formula

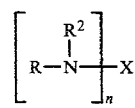

wherein, when n is 1, X may represent hydrogen, an alkali metal or $PR_2^1X$; when n is 2, X is a radical of the type $-PR^1$, $R^1$ being selected amongst the above-mentioned radicals and, when n is 3, X represents P, $R^2$ and $R^3$, identical or different from each other, may represent an alkyl, alkylaryl, aryl-alkyl, cycloalkyl radical, at least one of the two radicals containing one or more non racemic chiral centers. The said preparation of the compounds can be carried out according to one of the following schemes:

$$R^*NH_2 + R_2PCl + B \rightarrow R^*-NH-PR_2 + HCl \quad (1)$$

$$RR^*NH + R_2PCl + B \rightarrow RR^*N-PR_2 + HCl \quad (2)$$

$$RR^*NNa + R_2PCl \rightarrow RR^*N-PR_2 + NaCl \quad (3)$$

$$2RR^*NH + RPCl_2 + 2B \rightarrow (RR^*N)_2PR + 2B.HCl \quad (4)$$

$$R^*NH_2 + 2R_2PCl + 2B \rightarrow R^*N(PR_2)_2 + 2B.HCl \quad (5)$$

$$(RR^*N)_2PR + ROH \rightarrow (RR^*N)PR(OR) + RR^*NH \quad (6)$$

$$3RR^*NH + PCl_3 + 3B \rightarrow (RR^*N)_3P + 3B.HCl \quad (7)$$

wherein the groups R have the above meanings, B is an organic base, or the preparation can be carried out according to already known processes and related to the corresponding achiral compounds.

Amongst the optically active amines ($R^*NH_2$) there can be for instance cited alpha-methyl-benzylamine, bornylamine, sec.-butylamine, menthylamine or any primary amine containing one or more non racemic chiral centers; or secondary amines ($R^*RNH$) wherein one or both the groups attached to the nitrogen atom contain one or more non racemic chiral centers. For example, unsubstituted N alpha-methylbenzylamine, pipecoline, desoxephedrine, O-substituted ephedrine, N-monosubstituted and N,N'-disubstituted ethylendiamine with at least a non racemic chiral substituent, piperazines containing one or more non racemic chiral centers.

The active catalytic complex is formed in the asymmetrical hydrogenation by reacting one of the above described ligands with a coordination compound of a metal of the transition series, preferably Cr Mo W Fe Co Ni Ru Rh Pd Pt Os Ir Cu Ag Au Ti V.

The ligands of the coordination compounds can be anionic or neutral. Amongst the anionic ligands the halogens, the cyanide, nitrate, acetate, acetylacetonate, the sulfide and like ions can be cited. Amongst the neutral ligands, water, ammonia, amines, phosphines, carbon monoxide, olefins, diolefins and the like can be cited.

Amongst the representative compounds rhodium$^{(III)}$ hydrated chloride, ruthenium$^{(III)}$ chloride, dichloro-tetrakis (triphenylphosphine)ruthenium$^{(II)}$, rhodium$^{(I)}\mu$-dichloro-tetrakis (ethylene), rhodium$^{(I)}\mu$-dichloro-bis(-norbornadiene), dichlorotetraamino-platinum$^{(II)}$, dibromo-tetrakis(triphenylphosphine) palladium can be indicated.

The catalysts in question can be used in the form of a fine powder or granules or can have any shape which is appropriate to the contact procedure to be used.

The process of asymmetric reduction is carried out at a temperature comprised between $-70°$ C. and $+200°$ C., preferably between $0°$ C. and $50°$ C. at a hydrogen pressure up to 200 atm, preferably between 1 and 50 atm, and with a molar ratio of the substrate to the catalyst variable between 10 and 10,000.

A few operative characteristics are described in the ensuing examples, which are no limitation and are given only to illustrate the invention.

EXAMPLE 1

One gram of Hectorite slurried in anhydrous methanol has been exchanged with rhodium by placing them to reach equilibrium overnight with 0.475 g of [Rh COD L]+CLO4− in 50 mls methanol.

COD=cyclooctadiene: L=N—N' bis (R(+) alpha-methyl-benzyl) N—N' bis (diphenylphosphino) ethylenediamine.

Hectorite takes an intense yellow color and is carefully washed with anhydrous methanol and then dried. The Rhodium contents is 1.6% by wt.

Such compound has been slurried in anhydrous ethanol and hydrogenated in an autoclave at a pressure of 20 atm. of hydrogen: there is obtained a product colored in dark red which is characteristic of the hydride species of the Rhodium complex, which has been used in the hydrogenation of the alpha-acetaminocinnamic acid.

A glass flask has been charged with 0.942 g of substrate in 25 mls anhydrous ethanol and 0.450 g of previously hydrogenated catalyst. The flask has been connected to a hydrogenation apparatus working under atmospherical pressure. The progress of the reaction has been monitored with the conventional pressure-checking procedures. After 8 hours, the reaction has been stopped: the catalyst has been filtered off and the solution evaporated to dryness. The product, characterized through NMR analysis was R(+)N-acetyl-phenylalanine with $[\alpha]_D^{20} = 21.5$ (c=1 anhydrous ethanol).

EXAMPLES 2–6

With the same catalyst of the previous example there have been performed hydrogenation cycles of the alpha-acetaminocinnamic acid: the data which have been obtained are collected in Table 1.

The catalyst is recovered after each cycle by filtration of the reaction mixture, washed with anhydrous ethanol and reused under the same conditions.

TABLE 1

| Cycles | [c] substrate % | Reaction time hrs. | [α] 1% Soln. anh.ethanol | % e.e. |
|---|---|---|---|---|
| 1 | 4.4 | 2 | +0.170 | 37 |
| 2 | 4.4 | 20 | +0.218 | 47 |
| 3 | 4.3 | 20 | +0.230 | 50 |
| 4 | 4.3 | 4 | +0.144 | 31 |
| 5 | 4.5 | 20 | +0.184 | 40 | catalyst:Hectorite(RhCODL) g = 0.510
substrate:alpha-acetaminocinnamic acid
pressure:20 atm of H$_2$
temperature:room temp. 23° C.
solvent:anhydrous ethanol

EXAMPLES 7–12

Hectorite, prior to balancing with the cationic complex of Rhodium, has been treated with diluted acetic acid to remove the carbonates which were present and then thoroughly washed until the washing waters were neutral. The catalyst has been prepared with the same procedure as described in the previous example.

Table 2 reports the data as obtained in successive cycles of reduction of the alpha-acetaminoacrylic acid.

TABLE 2

| Cycles | [c] substrate % | Reaction time hrs. | [α] c = 1,H$_2$O | % e.e. |
|---|---|---|---|---|
| 1 | 1.9 | 1.1/2 | −0.355 | 53 |
| 2 | 2.0 | 1.1/4 | −0.425 | 64 |
| 3 | 2.0 | 1.0 | −0.430 | 65 |
| 4 | 2.0 | 1.3/4 | −0.440 | 66 |
| 5 | 2.1 | 1.1/4 | −0.437 | 66 |
| 6 | 2.0 | 2.1/2 | −0.412 | 62 |

Hydrogenation of alpha-acetaminoacrylic acid
Catalyst: Hectorite (RhCODL) g 0.550
Room temperature: 23° C.
Pressure: 1 atm H$_2$
Solvent: anhydrous ethanol

EXAMPLE 13

With the catalyst prepared as in example 7 there have been reduced 0.725 g of 3-acetoxy, 4-methoxy, alpha-acetaminocinnamic acid dissolved in 25 mls of anhydrous ethanol. The reaction has been carried out in an autoclave (glass) with a hydrogen pressure of 2 atm at room temperature. There has been obtained 3-acetoxy, 4-methoxy, N-acetylphenylalanine with an optical yield of 58%. $[\alpha]_D^{22} = +12.8$ (c=1, acetone) the $[\alpha]_D^{22}$ (c=1, acetone) of enantiomerically pure 3-acetoxy, 4-methoxy N-acetylphenylalanine=22.

EXAMPLES 14–18

In the following examples there are reported the data obtained (Table 3) in tests of asymmetric hydrogenation with a catalyst obtained by immobilizing the cationic complex of Rhodium on bentonite. The preparation of the catalyst has been made as described in Example 1. The reduction cycles have been carried out as in Example 2.

TABLE 3

| Cycles | [c] substrate % | Reaction time hrs. | [α] c = 1,H$_2$O | % e.e. |
|---|---|---|---|---|
| 1 | 1.95 | 3 | −0.272 | 41 |
| 2 | 1.95 | 6 | −0.348 | 52 |
| 3 | 1.95 | 8 | −0.375 | 56 |

TABLE 3-continued

| Cycles | [c] substrate % | Reaction time hrs. | [α] c = 1,H₂O | % e.e. |
|---|---|---|---|---|
| 4 | 2.0 | 10 | −0.352 | 53 |
| 5 | 2.0 | 24 | −0.416 | 62 |

Hydrogenation of alpha-acetaminoacrylic acid.
Catalyst: Bentonite (Rh COD L) g 0.450
Room temperature: 23° C.
Pressure: 1 atm H₂
Solvent: anhydrous ethanol

EXAMPLES 19–21

There are reported data obtained in reduction tests with a catalyst obtained by immobilizing the cationic complex of Rhodium on Halloysite. The preparation of the catalyst has been effected as described in Example 1. The reduction cycles have been performed as described in Example 2.

TABLE 4

| Cycles | [c] substrate % | Reaction time hrs. | [α] c = 1,H₂O | % e.e. |
|---|---|---|---|---|
| 1 | 1.8 | 3 | −0.495 | 74 |
| 2 | 2.0 | 3 | −0.515 | 77 |
| 3 | 2.0 | 24 | −0.500 | 75 |

Hydrogenation of alpha-acetaminoacrylic acid.
Catalyst: Halloysite (RhCOD L) g 0.500
Room temperature: 23° C.
Hydrogen pressure: 1 atm
Solvents: anhydrous ethanol.

We claim:

1. In a method for the asymmetric hydrogenation of a prochiral olefin comprising contacting said olefin with a catalyst composed of a cationic complex of rhodium with aminic derivatives of phosphorus, the improvement comprising immobilizing said catalyst on a silicate clay material selected from the group consisting of smectites and kaolin.

2. In a method for the asymmetric hydrogenation of an alpha-acylamido acrylic acid comprising contacting said acid with a catalyst composed of a cationic complex of rhodium with aminic derivatives of phosphorus, the improvement comprising immobilizing said catalyst on a silicate clay material selected from the group consisting of smectites and kaolin.

3. In a method for the asymmetric hydrogenation of a prochiral olefin selected from the group consisting of alpha-acetoaminocinnamic acid, alpha-acetoaminoacrylic acid, and 3-acetoxy-4-methoxy alpha-acetoaminocinnamic acid comprising contacting said olefin with a catalyst composed of a cationic complex of rhodium with aminic derivatives of phosphorus, the improvement comprising immobilizing said catalyst on a silicate clay material selected from the group consisting of smectites and kaolin.

4. The method of claim 2 or 3 characterized in that the reaction takes place at a temperature between −70° C. and 200° C.

5. The method of claim 4 wherein said temperature is between 0° C. and 50° C.

6. The method of claim 2 or 3 characterized in that the reaction takes place at a hydrogen pressure up to 200 atmospheres.

7. The method of claim 6 wherein said hydrogen pressure is between 1 and 50 atmospheres.

8. The method of claim 2 or 3 wherein the molar ratio of the silicate clay material to the catalyst is from 10 to 10,000.

* * * * *

UNITED STATES PATENT AND TRADEMARK OFFICE
CERTIFICATE OF CORRECTION

PATENT NO. : 4,328,364
DATED : May 4, 1982
INVENTOR(S) : Marcello Mazzei, Mario Riocci & Walter Marconi It is certified that error appears in the above-identified patent and that said Letters Patent are hereby corrected as shown below:

Column 2, Reactions 4 and 5, "2B.HCl" should read --2 B·HCl--.

Column 2, Reaction 7, "3B.HCl" should read --3 B·HCl--.

Column 3, lines 34-35 cancel "[Rh COD L] + $ClO_4^-$ and insert -- [Rh COD L]$^+ClO_4^-$ --

Signed and Sealed this

Fifth Day of October 1982

[SEAL]

Attest:

Attesting Officer

GERALD J. MOSSINGHOFF
Commissioner of Patents and Trademarks